Figure 1:
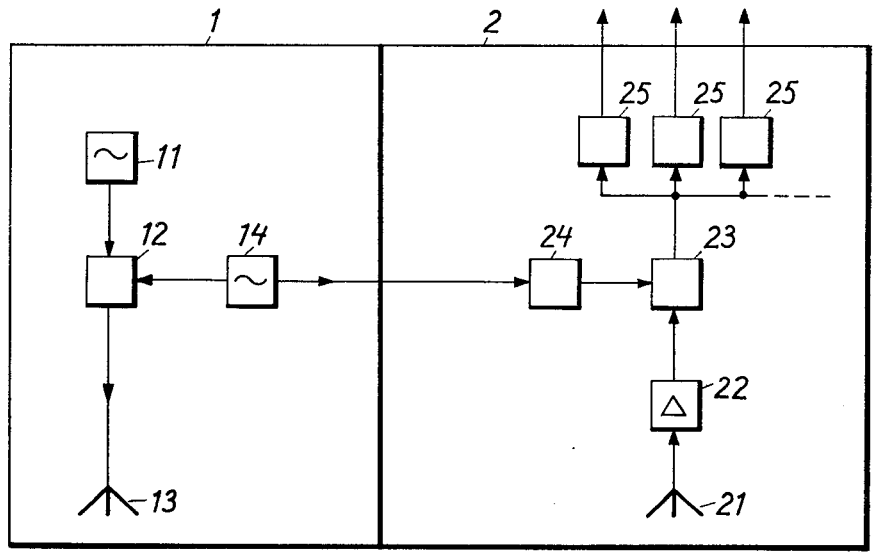
Figure 1:
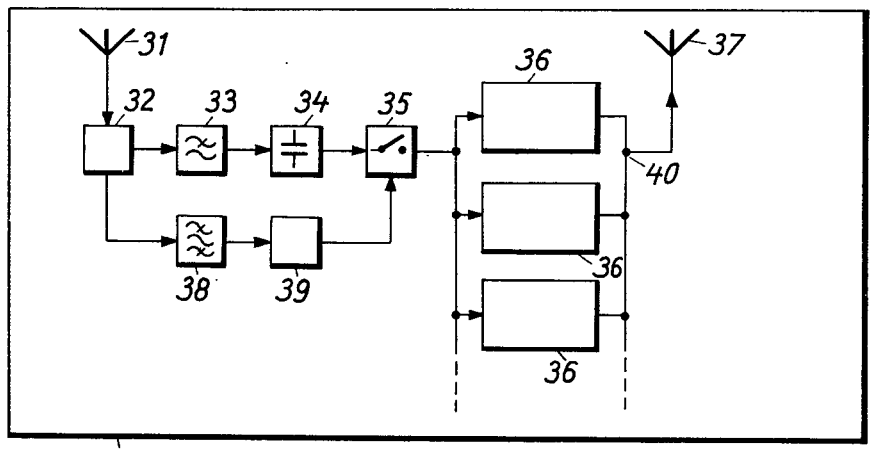

United States Patent [19]

Gustavsson et al.

[11] 3,982,243

[45] Sept. 21, 1976

[54] DEVICE FOR TRANSMISSION OF INFORMATION FROM AN INFORMATION EMITTER TO AN INFORMATION SEEKER

[75] Inventors: Per-Olof Gerhard Gustavsson, Pixbo; Bo Anders Morwing, Molndal, both of Sweden

[73] Assignee: Telefonaktiebolaget L M Ericsson, Stockholm, Sweden

[22] Filed: Nov. 5, 1974

[21] Appl. No.: 520,975

[30] Foreign Application Priority Data

Nov. 30, 1973 Sweden .............................. 7316256

[52] U.S. Cl. .......................... 343/6.5 R; 343/6.5 SS; 343/6.8 R
[51] Int. Cl.² ........................................... G01S 9/56
[58] Field of Search ........... 343/6.5 SS, 6.5 R, 6.8 R

[56] References Cited
UNITED STATES PATENTS

| | | | |
|---|---|---|---|
| 3,389,391 | 6/1968 | Keeler et al. | 343/6.8 R |
| 3,406,391 | 10/1968 | Le Von, Jr. | 343/6.5 R |
| 3,427,613 | 2/1969 | Kawahara et al. | 343/6.5 SS |
| 3,427,614 | 2/1969 | Vinding | 343/6.5 SS |
| 3,713,148 | 1/1973 | Cardullo et al. | 343/6.5 R |
| 3,737,911 | 6/1973 | Sakuragi | 343/6.5 SS |
| 3,745,569 | 7/1973 | Works | 343/6.5 SS |

*Primary Examiner*—Maynard R. Wilbur
*Assistant Examiner*—S. C. Buczinski
*Attorney, Agent, or Firm*—Hane, Baxley & Spiecens

[57] ABSTRACT

A device for automatic transmission of information includes an information emitter and an information seeker wherein the information is transmitted from the emitter to the seeker in response to an interrogating signal from the information seeker. The emitter relies for transmission on energy which is extracted from the interrogating signal. The emitter is provided with several resonant circuits, each of which generates an information signal component. The information carrying signal comprises a multitude of such signal components. From the information carrying signal the information is captured by detection in the information seeker of the respective information signal components.

6 Claims, 4 Drawing Figures

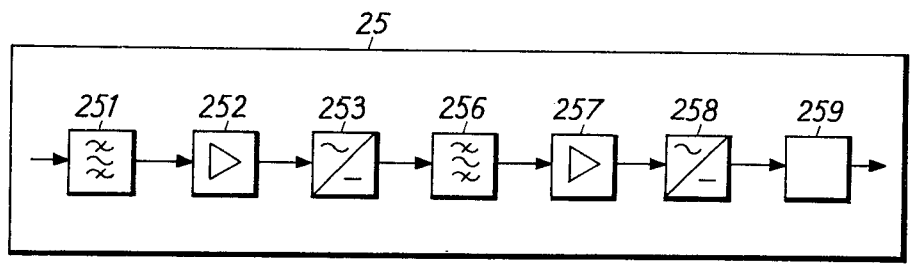
Fig.3
Fig.4 A
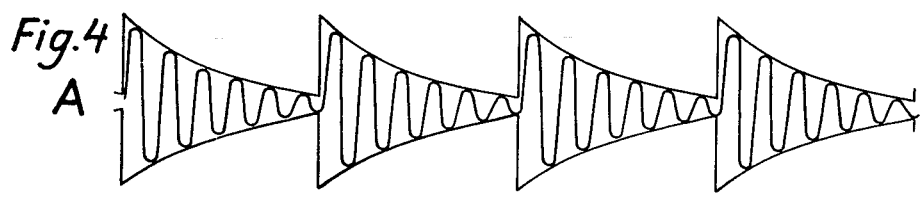
Fig.4 B
Fig.4 C
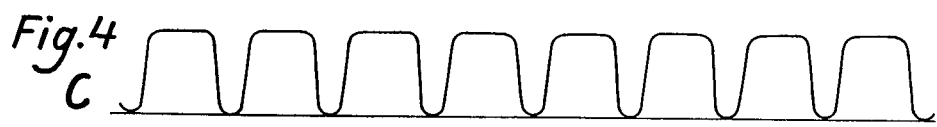
Fig.4 D
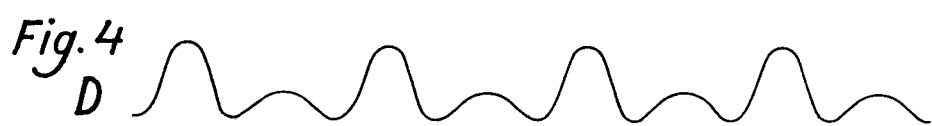
Fig.4

DEVICE FOR TRANSMISSION OF INFORMATION FROM AN INFORMATION EMITTER TO AN INFORMATION SEEKER

There are a great number of known devices for information transmission, for example for remote sensing of physical quantitites. Generally such information transmission is performed by an information emitter emitting information to one or several receivers of the information whether or not the receivers, during a certain time are in need of the information. In other systems, for example in systems for identifying objects, the information emitter emits information only when a signal to the information emitter from an information receiver has indicated that information transmission from the information emitter to the information receiver is desired. The receivers in these systems can suitably be called information seekers. Both the indication that information is desired and the information transmission is generally performed in this connection with electrical signals on wires or wireless with the aid of electromagnetic radiation.

In a known device the information seeker sends an information demand signal with a fixed frequency, usually in the microwave region, the information emitter in response thereto emitting an information carrying signal with another fixed frequency and modulated with a pulse code. This method is applied for example in the control of air traffic, where the demand signal can be modulated also with a code which determines the type of information which is demanded, for example the identity or position of an aeroplane. In this type of system, pulse modulation as well as phase or frequency modulation is used. Such systems are most complicated and expensive.

There are also systems where the information transmission is made optically. Such systems have a very good directional effect and are applicable for example for identifying railway cars.

In an optical device of this kind variations are sensed in the light reflecting power of a plate or the like which is coded individually for each railway car. Another optical method is based on a colour code where a number of strips with different colours are scanned with the aid of a rotating mirror. Optical systems are, however, susceptible to dirt, snow etc. which cause a faulty function.

The known microwave systems for information transmission have the drawback that high attenuation in both transmission directions often occur at microwave frequency which have a deleterious effect on the transmission quality. The attenuation can for instance be highly dependent on water or snow which in some cases covers the information emitter. Furthermore these systems demand a relatively large bandwidth per information bit owing to limitations from available components, for example the Q-factors of the resonant circuits or the lack of frequency stability of the oscillators.

A microwave system for automatic identification of railway cars is described in the Swedish patent No. 337,842 where an information seeker, via an antenna, sends a demand signal, the frequency of which is scanned over a suitably chosen frequency range and where an information emitter is provided with a number of resonant circuits which are connected so that the demand signal at certain frequencies is absorbed and at other frequencies is reflected to give a characteristic code for each information emitter. The signal thus coded is sent back to the information seeker in which said code is decoded.

In another known identifying device, a demand signal is sent out with a fixed frequency, the demand signal being sent back on the same frequency after reception in an information emitter. Information is transmitted by way of pulsing (reflection and absortion respectively) of the demand signal according to a chosen pattern (code) before the retransmission.

In systems where information is sent back to information seekers at the same frequency which is used when inquiring from the information seeker there are risks that strong disturbing reflections may occur from the surroundings of the information emitter and from coverings of water, snow, and ice on the information source.

Devices for information transmission have also been proposed where the frequency of a retransmitted, information carrying signal constitute a multiple of the frequency of the demand signal. However, this technique does not eliminate the risk for errors because of undesired reflections from the surroundings of the information emitter due to the fact that the demand signal emitted from the information seeker in practice, besides its fundamental with a certain frequency, also contains harmonics with frequencies which are multiples of said certain frequency. These harmonics can be reflected from the surroundings of the information emitter and be received by the information seeker. Moreover there is still the drawback with the high attenuation in two transmission directions and with that demands for a high emitted power which is expensive, but above all involves higher risk for disturbance of other microwave systems and risks for biological injury. Such drawbacks are not eliminated with the likewise earlier known system, according to which two separate signals, namely one at low frequency and one at microwave frequency, are transmitted to an information emitter where mixing takes place with the subsequent retransmission at microwave frequency.

An object of the present invention is to eliminate the above-discussed drawbacks to the greatest possible extent with maintenance of reliable information transmission at reasonable costs. The characterizing features of the invention are evident from the appended claims.

Transmission of large amounts of information with great reliability and high precision is made possible by the invention. Furthermore the proposed information emitter is completely passive, i.e. it does not demand any external power which is of great importance for some applications.

According to one example by using the invention, information about, for instance, real or allowed speed respectively may easily be transmitted from or to vehicles. Another example is the application of the invention in connection with certain kinds of remote sensing, for instance measuring of quantitites of electric power transmission where great demands are made on electric isolation between information seeker and information emitter.

Figure 2:
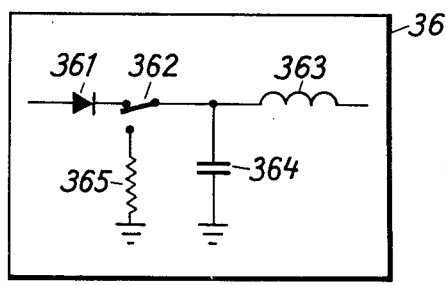

The invention will be described more in detail in connection with the attached drawing where FIG. 1 shows a schematic block diagram on a device according to the invention, FIG. 2 shows an embodiment of a resonant circuit included in the device according to FIG. 1, FIG. 3 shows an embodiment of a detector included in the device according to FIG. 1, and FIG. 4 shows graphs of different signals in the device.

The device according to FIG. 1 comprises an information seeker 1, 2 with a transmitter 1 and a receiver 2 and an information emitter 3.

The transmitter 1 comprises a carrier signal source 11, a modulator 12, an antenna 13 and a modulation signal source 14. The units 11–13 are connected in series and the modulation signal source 14 is connected to the modulation input of the modulator 12.

The receiver 2 comprises an antenna 21, an amplifier 22, a second modulator 23, a matching unit 24, and a number of mutually parallel connected detectors 25. The units 21–23 and 25 are connected in series with each other and the matching unit 24 is connected to the modulation input of the modulator 23. Furthermore the modulation signal source 14 of the transmitter is connected to the matching unit 24. The modulator 23 and the matching unit 24 are not necessary for the function of the device, but may be included in order to increase the reliability of the information transmission; their function will be explained more in detail in the following.

The information emitter 3 comprises an antenna 31, a demodulator 32, a low pass filter 33, a capacitor 34, a periodically controlled switch 35, a connectable resonant circuit 36, an antenna 37, a band pass filter 38, and a pulse forming circuit 39. The units 31–37 are connected in series with each other and the units 38 and 39 in series with each other. The band pass filter 38 is connected to the demodulator 32 and the pulse shaping circuit 39 is connected to the control input of the switch 35.

An information seeking signal in the form of a carrier wave modulated by a modulation signal is formed in the transmitter 1 with the aid of the carrier wave signal source 11, the modulation signal source 14 and the modulator 12 is transmitted from antenna 13. This signal is received by the antenna 31 of information emitter 3 and demodulated in the demodulator 32 and is filtered in the low pass filter 33. The transmitted energy is stored in the capacitor 34. The demodulated signal is filtered in the band pass filter 38 and is given pulse shape in the pulse shaping circuit 39 which controls the switch 35. The energy stored in the capacitor 34 is periodically transmitted via the switch 35 to the parallel connected resonant circuits 36, where attenuated oscillations with exponentially decaying amplitude and with frequencies determined by the resonance frequencies of the circuits are started. The attenuated oscillations form together a signal containing the information which is to be transmitted and it is therefore called the information carrying signal. The information carrying signal which consists of the information signal components generated by the resonant circuits are transmitted from antenna 37 to the antenna 21 of the receiver 2 of the information seeker where it is amplified in the amplifier 22. The second modulator 23 is connected between the amplifier 22 and the detectors 25. Each detector 25 corresponds to one of the resonant circuits 36 in the information emitter 3. On the outputs of the detectors the transmitted information occurs, the utilization of which is dependent on the application. It may for example be converted for presentation or for the manoeuvring of the speed of a vehicle.

After the main principle of the device according to FIG. 1 has been stated the different units will be more fully explained. The carrier signal source 11 generates a carrier signal to the modulator 12 and is of conventional execution. The execution more in detail is of course dependent on the carrier frequency which in its turn is determined by the actual technical application.

If frequency modulation is used the modulator 12 may with advantage be integrated in the signal source 11. The modulator 12 modulates the carrier signal with a modulation signal from the modulation signal source 14. Of the known modulation methods the amplitude modulation should in most cases be the most simple and cheapest alternative. The modulation signal can consist of a sinusoidal signal or a repeated pulse signal.

The form of the antennas 13, 31 and 37, 21, respectively, is very dependent on the application as well as on the frequency range chosen for the signal transmission. At frequencies lower than 50 MHz and for a short transmission distance inductive coupling is preferred, while at higher frequencies antennas of for example dipole, helix, slot or parabola type may be used.

The execution of the demodulator 32 of the information emitter 3 is dependent on the chosen modulation method. For amplitude modulation the demodulator consists in the most simple case of a detector diode. The energy transmitted to the information emitter 3 from the information seeker 1 is stored in the capacitor 34 following the low pass filter 33 which is of a conventional type.

The modulation signal restored with the aid of the demodulator 32 is filtered in the band pass filter 38 and is given a suitable pulse form in the pulse forming circuit 39. The pulse form can for instance be obtained with a so called SCR-circuit (Silicon Controlled Rectifier). The charge on the capacitor 34 is transmitted via the switch 35 to the resonant circuits 36 in synchronism with the transmitted modulation signal. The switch 35 consists in its most simple form of a switch transistor.

The charge transmitted to the resonant circuit 36 starts an attenuated oscillation in the resonant circuit which at the charge input has a diode 361 (FIG. 2) to isolate the parallel connected resonant circuits from each other. The waveforms of the oscillating is described by FIG. 4 A.

The resonant frequency of the resonant circuit 36 is determined by the inductance of a coil 363 and the capacitance in a capacitor 364. The information which is to be emitted is controlled by a change-over switch 362 which switches the resonant circuit in question in and out. The transmitted information consequently is determined by which resonant frequencies are present in the information carrying signal. The change-over switches can be substituted by, for example, fixed connections if the information source always transmits the same information, or by relay contacts if the information is to be changed.

Upon disconnection, a resistor 365 can be connected in parallel with the capacitor 364 so that the Q-value of the resonant circuit is descreased with the effect that an oscillation which is initiated in an adjacent resonant circuit and via the connection point 40 adjacent to the antenna 37 influences any other resonant circuit, is quickly attenuated.

The receiver 2 of the information seeker is provided with said input amplifier 22 of a conventional kind. The steep rise in amplitude of the received information carrying signal, see FIG. 4 A, at the time of the closing of the switch 35 in the information source 3, gives the signal a content of disturbing components within a broad band spectrum. This can complicate the restoring of the information from the received information carrying signal. The second modulator 23 is inserted after the amplifier 22 for attenuation of the received signal during the short time when its amplitude rises steeply which implies that the signal thus treated is virtually free from disturbing components. FIG. 4 B shows how the total amplification of the amplifier 22 and the second modulator 23 can vary with time. To have the attenuation occur at the right moment, the second modulator 23 is controlled from the signal source 14 via the matching unit 24 for matching of the phase of the control signal to the control signal input of the second modulator 23.

Sometimes it may occur that disturbing signals, for example from strong radio transmitters with a frequency which is close to one of the frequencies of the information emitter 3 are received in the receiver 2. In order to have such disturbing signals suppressed the matching unit 24 is in reality arranged for controlling of the second modulator 23 with a frequency which is double the modulation frequence of the signal source 14. The total amplification of the amplifier 22 and the second modulator 23 will thus vary according to the curve in FIG. 4 C, consequently with two peaks for each period of the modulation frequency. When the second modulator 23 controlled with the double modulation frequency, influences the information carrying signal with the form according to FIG. 4 A, this will after detection have a waveform, as shown in FIG. 4 D, with two peaks for each period of the modulation frequency, one peak being high and one peak being low. From this signal it is possible to filter a signal with a frequency which is equivalent to the modulation frequency. This is achieved for example with said band pass filter for the modulation frequency. If, on the other hand, a disturbing signal with a constant amplitude and no information carrying signal is received, the waveform of the disturbance will after detection still be described with FIG. 4 C. The disturbing signal is thereafter filtered with a band pass filter for the modulation frequency whereby the detected disturbing signal which only contains components with double the modulation frequency and multiples thereof is suppressed.

One arrangement of the detector 25 is shown in FIG. 3. A band pass filter 251 determines the frequency of the detector which corresponds to one of the frequencies of the resonant circuit 36. The filter is of conventional type where the demands on bandwidth and selection are determined by the application. A conventional amplifier 252 amplifies the signal before a detector 253. The oscillation in the resonant circuits have an exponentially decaying amplitude between two excitations which means that the signal emitted from the resonant circuit will be amplitude modulated with frequencies which are integer multiples of the frequency of the modulation signal. The fundamental in this modulation can be detected in the detector 25 in the manner that after the detector 253 is connected a band pass filter 256 with the frequency of the fundamental, an amplifier 257 and a second detector 258. The signal thus detected is fed to a threshold circuit 259. With the band pass filter 256 is also obtained the earlier described suppression of disturbing signals from radio transmitters that do not belong to the system. In the shown example there is used a combination of carrier wave detection and modulation detection which is achieved with the detection of the presence of the modulation signal in the devices 256–259, i.e. after its passage of the band pass filter 251 for the carrier.

In certain applications it can be sufficient to use only the carrier wave detection, the circuits 256–258 being replaced with a low pass filter, not shown in the drawing which smooths the modulation signal and delivers a DC voltage, the amplitude of which is equal to the rectified mean value of the input signal to the detector 253. In such cases the second modulator 23 and the matching unit 22 are also excluded from the receiver 2.

In a system with information seekers and information emitters arranged according to the description a carrier frequency of 50 MHz is used in the emitter, the modulation frequency is chosen at 10 kHz and the are 16 resonant circuits arranged for frequencies around 1 MHz.

A device according to the invention may be applicable for example in railway signal systems, where passive information emitters are placed between the rails in the roadbed and give information for example about allowed speed to an information seeker placed on an engine. This information system does then suitably constitute a complement to the existing optical signal system.

The invention is not limited to the above described applications, but can be varied within the scope for the following claims. The information seeking signal can for example consist of only a carrier signal for the energy transmission. The necessary signal for operating the switch 35 is then generated by for example an astable flip-flop connected in the information emitter 3 which is driven by the transmitted energy.

We claim:

1. An information transmission system comprising an information emitter and an information seeker; said information seeker comprising transmitter means for transmitting an interrogation signal which is a carrier signal modulated by a modulating signal having a given frequency; said information emitter comprising receiver means for receiving the interrogating signal, storage means connected to said receiver means for temporarily storing the energy in the received interrogating signal, and emitter means energized by the energy stored in said storage means for emitting information pulses of an information carrying signal, said information pulses having a repetition rate related to said given frequency and components which are simultaneously damped oscillations of specific frequencies; and said information seeker further comprising further receiver means for receiving said information pulses of information carrying signal, modulator means for modulating said information pulses of information carrying signal with a signal having a frequency which is an integral multiple of said given frequency, and a plurality of frequency sensitive detector means, connected in parallel with said modulator means, for detecting different ones of said information pulses of information carrying signal, each of said frequency sensitive detector means comprising, connected in series, a band-pass filter means for passing a signal having frequencies corresponding to one of said specific frequencies, a demodulator means, and a second filter means for passing signals having said given frequency of the modulating signal.

2. The information transmission system of claim 1 wherein said receiver means of said information emitter comprises a demodulator means for demodulating the interrogating signal and having an output connected to said storage means, and said emitter means of said information emitter comprises resonant circuit means and switching means for controllably connecting said storage means to said resonant circuit means.

3. The information transmission system of claim 2 wherein said switching means for controllably connecting said storage means to said resonant circuit means comprises a switch having an input connected to said storage means, an output connected to said resonant circuit means, and a pulse responsive control input, and pulse forming means for forming pulses connecting the output of said demodulator means to the control input of said switch means.

4. The information transmission system of claim 3 wherein said pulse forming means comprises a band pass filter means for passing signals having said given frequency of the modulating signal and a pulse shaper connected in series.

5. The information transmission system of claim 1 wherein said information seeker includes modulating signal generating means for generating the modulating signal having the given frequency, and signal matching means for connecting said modulating signal generating means to said modulator means.

6. The information transmission system of claim 5 wherein said signal matching means includes frequency multiplier means.

* * * * *